United States Patent
Filipiak et al.

(10) Patent No.: US 7,178,421 B2
(45) Date of Patent: Feb. 20, 2007

(54) DUAL SPHERICAL BALL CLAMP

(75) Inventors: Michael A. Filipiak, Ann Arbor, MI (US); Richard Rial Hamann, Saline, MI (US); Timothy John Key, Onsted, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 600 days.

(21) Appl. No.: 10/037,852

(22) Filed: Jan. 4, 2002

(65) Prior Publication Data

US 2002/0094227 A1 Jul. 18, 2002

Related U.S. Application Data

(60) Provisional application No. 60/259,686, filed on Jan. 4, 2001.

(51) Int. Cl.
*B25J 17/00* (2006.01)

(52) U.S. Cl. .................. 74/490.05; 74/490.05; 901/28; 248/278.1; 248/288.31

(58) Field of Classification Search ............. 74/490.01, 74/490.05; 269/75; 901/28; 248/278.1, 248/288.31; 403/56
See application file for complete search history.

(56) References Cited

U.S. PATENT DOCUMENTS

| | | | | |
|---|---|---|---|---|
| 890,336 A | * | 6/1908 | Coates | 464/114 |
| 1,455,441 A | * | 5/1923 | La Hodny | 248/484 |
| 3,962,575 A | * | 6/1976 | Vandenberg et al. | 248/340 |
| 4,453,446 A | * | 6/1984 | Hoshino | 84/421 |
| 4,898,490 A | * | 2/1990 | Herbermann et al. | 403/56 |
| 5,383,738 A | * | 1/1995 | Herbermann | 403/56 |
| 5,419,522 A | * | 5/1995 | Luecke et al. | 248/288.51 |
| 5,425,636 A | * | 6/1995 | Ghim | 433/64 |
| 5,692,412 A | * | 12/1997 | Rosheim | 74/490.05 |
| 5,718,635 A | * | 2/1998 | Park et al. | 464/114 |
| 5,845,885 A | * | 12/1998 | Carnevali | 248/181.1 |
| 5,846,015 A | * | 12/1998 | Mononen | 403/90 |
| 5,895,874 A | * | 4/1999 | Liao | 84/421 |
| 5,973,248 A | * | 10/1999 | Chen | 248/441.1 |
| 2002/0094227 A1 | * | 7/2002 | Filipiak et al. | 403/56 |
| 2005/0095058 A1 | * | 5/2005 | Biba et al. | 403/56 |

* cited by examiner

*Primary Examiner*—David Fenstermacher
(74) *Attorney, Agent, or Firm*—Carlson, Gaskey & Olds

(57) ABSTRACT

A dual spherical ball clamp is employed to allow for pivotal adjustment of a robotic arm to support an object in a desired position. The clamp is formed by a pair of clamp halves bolted together to form a pair of sockets. Each socket receives a spherical ball of an arm. The faces of the dual spherical ball clamp are slightly inclined outwardly with respect to the lower surface of the dual spherical ball clamp to provide for additional range of motion of the arms.

16 Claims, 2 Drawing Sheets

DUAL SPHERICAL BALL CLAMP

This application claims priority to provisional application serial No. 60/259,686 filed Jan. 4, 2001.

BACKGROUND OF THE INVENTION

Robotic arms often employ a ball and socket joint to allow for pivotal adjustment of the robotic arm in order to support an object in a desired position. In a ball and socket joint, a ball is received in a complementary socket of a socket component. Movement of the ball within the socket allows for pivotal movement of the ball and an attached arm. Securing the ball and socket joint creates a rigid arm capable of supporting an object.

In prior ball and socket joints, the arm has a relatively large diameter when compared to the diameter of the ball. Often, the large diameter of the arm creates an obstruction between the socket and the arm, hindering movement of the arm and reducing the range of motion of the robotic arm.

Hence, there is a need in the art for an improved ball and socket joint utilized on a robotic arm.

SUMMARY OF THE INVENTION

The dual spherical ball clamp of the present invention increases the range of motion of a robotic arm. The dual spherical ball clamp includes a pair of clamp halves secured together by bolts to form a pair of sockets. When assembled, a small gap is formed between the clamp halves.

Each socket receives a ball attached to an arm. The balls are made of a harder material than the material of the complementary sockets, allowing the sockets to better conform to the ball. Preferably, the sockets are made of aluminum. Additionally, the sockets surround the ball beyond the center of gravity of the ball, or over more than one half of the outer periphery of the ball, providing a greater holding force of the ball within the socket.

The faces of the dual spherical ball clamp are slightly inclined upwardly with respect to the lower surface of the clamp to provide an increased range of motion of the pivoting arms. Preferably, the faces are inclined 75° from a plane defined by the lower surface of the clamp.

Preferably, the clamp halves are secured together by either two bolts or four bolts. If four bolts are employed, a bolt is located above and below each of the sockets. The distance of the gap at one socket can differ from the distance of the gap at the other socket by adjusting the tightening of the bolts proximate to each socket. With the clamp halves secured, the clamp is locked, creating a rigid arm capable of supporting an object.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
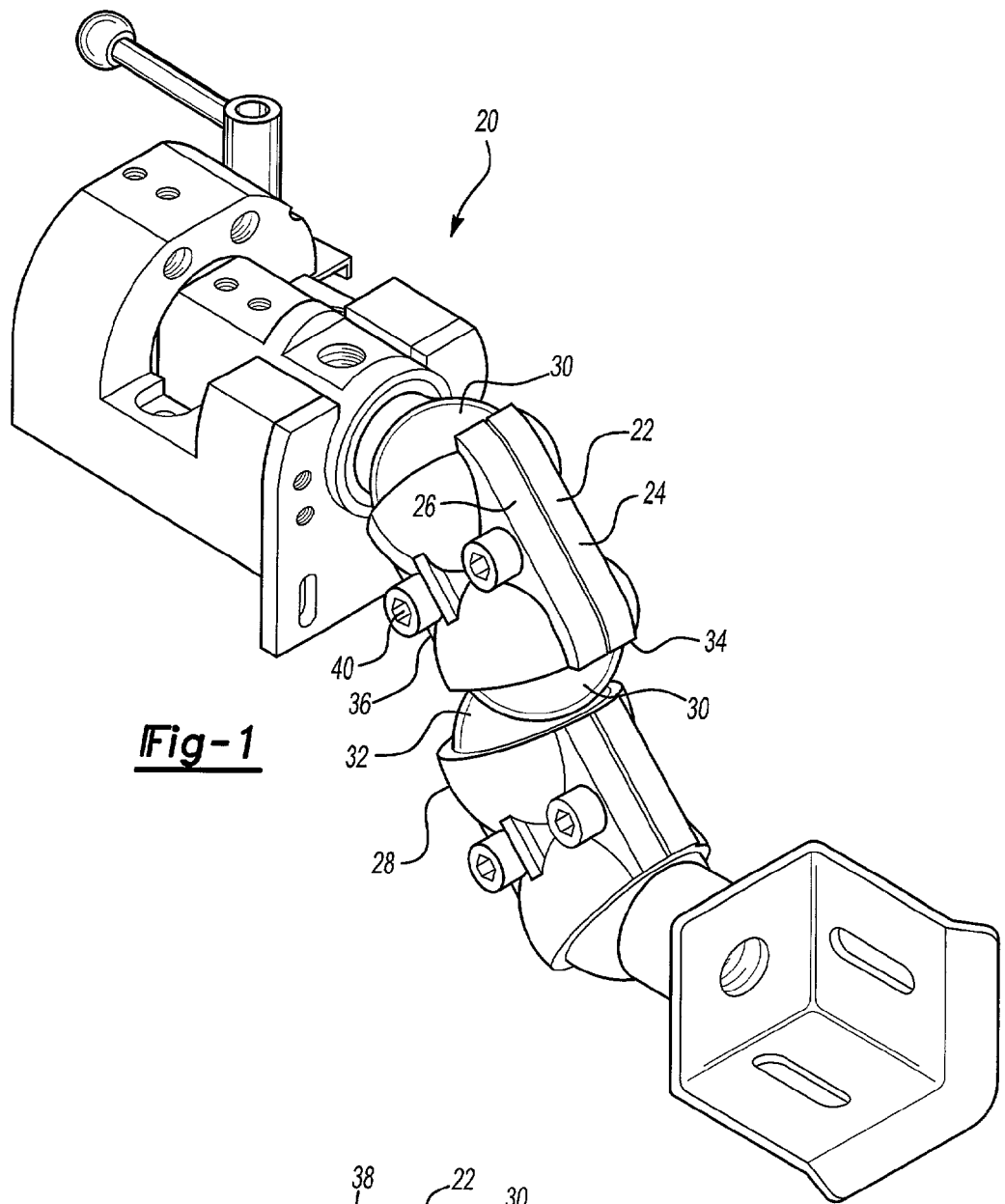
FIG. 1 illustrates a perspective view of the dual spherical ball clamp of the present invention utilized on a robotic arm.

FIG. 1 illustrates a robotic arm 20 employing the dual spherical ball clamp 22 of the present invention for pivotal adjustment of the robotic arm 20 to support an object in a desired position. The dual spherical ball clamp 22 includes a first clamp half 24 and an opposing second clamp half 26 which are secured together by bolts 40 to form a pair of sockets 28. Each socket 28 receives a spherical ball 30 attached to an arm 32. Securing the ball 30 and the socket 28 by tightening the bolts 40 creates a rigid robotic arm 20 capable of supporting the object. Preferably, each ball 30 is approximately 1.75 inch in diameter, and the arm 32 is approximately 1.25 inch in diameter.

Figure 2:
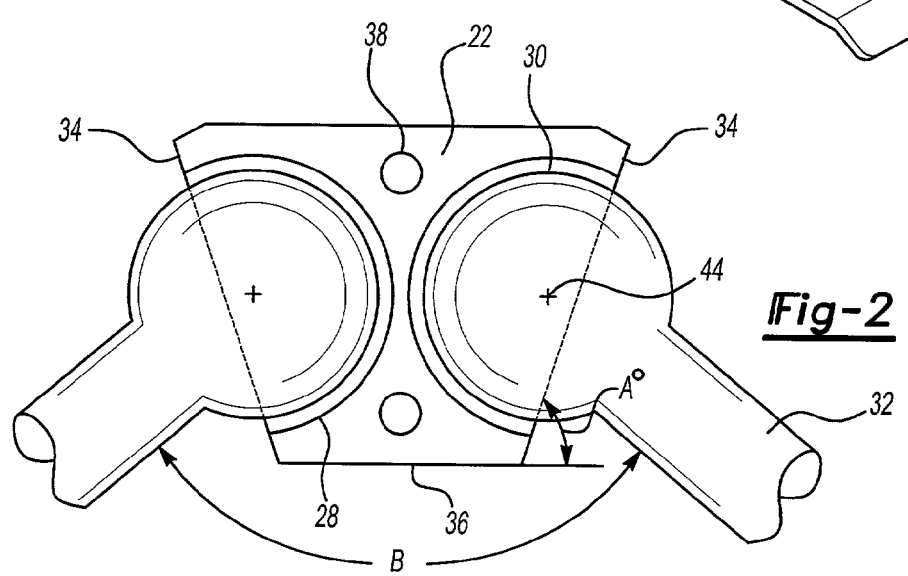
FIG. 2 illustrates a side view of one clamp half of the dual spherical ball clamp.

As illustrated in FIG. 2, the faces 34 of the dual spherical ball clamp 22 are slightly inclined upwardly with respect to the lower surface 36 of the dual spherical ball clamp 22. Each face 34 is inclined A degrees from a plane defined by the lower surface 36 of the clamp 22. Preferably, the faces 34 are inclined approximately 75° from the plane. The inclined faces 34 allow for additional range of motion of the arms 32 as a smaller angle B can be formed between the arms 32. Each arm 32 has a large range of motion, preferably at least 90°. Additionally, as shown in FIG. 2, a portion of the spherical balls 30 are exposed from the sockets 28.

Clamp half 22 includes a pair of apertures 38 which align with a pair of apertures 38 in the opposing clamp half 24 when assembled. The apertures 38 are located substantially between the pair of sockets 28. Returning to FIG. 1, a bolt 40 passes through the aligned apertures 38 to secure the halves 22 and 24 of the dual spherical ball clamp 22 together and to secure the balls 30 in the sockets 28. When assembled, a small gap 142 (shown FIG. 5) is formed between the clamp halves 22 and 24.

The balls 30 are made of a material which harder than the material of the complementary sockets 28, allowing the sockets 28 to conform around the ball 30 and increasing holding power of the dual spherical ball clamp 22. Preferably, the sockets 28 are made of aluminum. However, the dual spherical ball clamp 22 can be made of any material which is softer than the balls 30. The ball 30 could also have a serrated surface to provide greater holding force between the ball 30 within the socket 28.

Additionally, the sockets 28 surround the balls 30 beyond the center of gravity 44 of the balls 30. Stated another way, the sockets 28 extend over more than half of the outer periphery of the balls 30. This provides a greater holding force, but does present the problem of potentially limiting the relative movement of the arms 32, and hence results in the beneficial attributes of the inclined faces 32.

Although a robotic arm 20 employing a dual spherical ball clamp 22 is described, it is to be understood that a plurality of dual spherical ball clamps 22 can be employed to provide for additional movement of the robotic arm 20.

Figure 3:
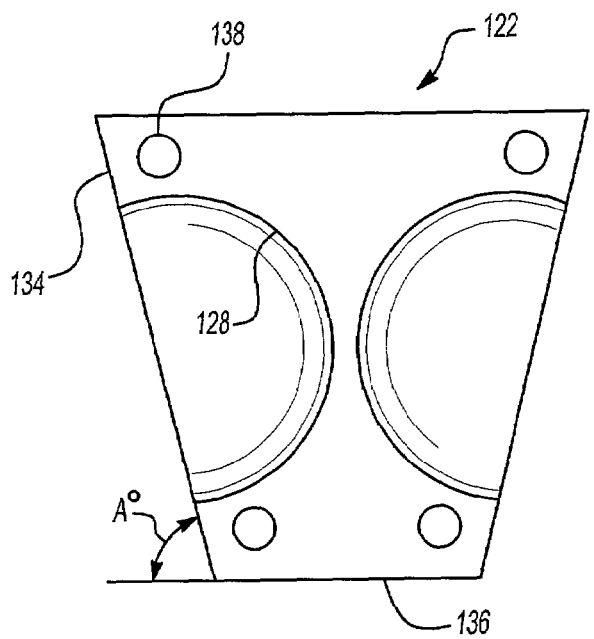
FIG. 3 illustrates a side view of one clamp half of a second embodiment of the dual spherical ball clamp.
Figure 4:
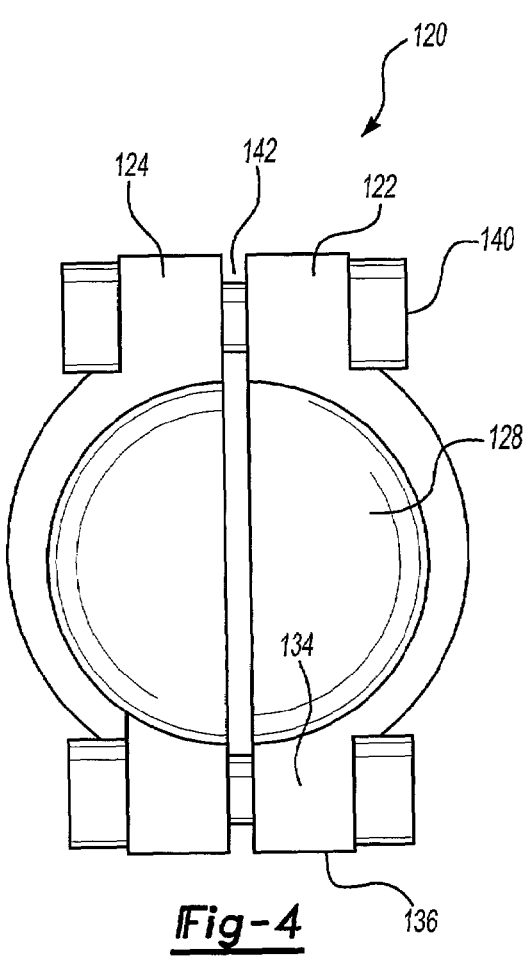
FIG. 4 illustrates a perspective view of one clamp half of the dual spherical ball clamp of FIG. 3.
Figure 5:
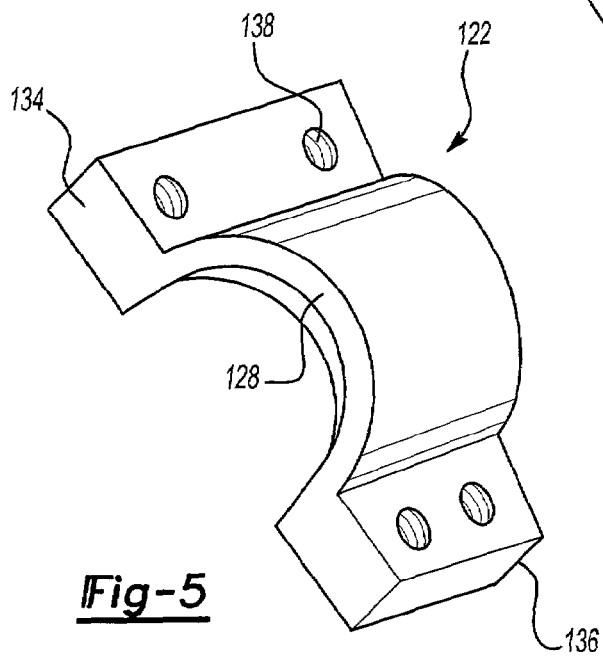
FIG. 5 illustrates a front view of the dual spherical ball clamp of FIG. 3.

In another embodiment of the present invention, as illustrated in FIGS. 3–5, four apertures 138 are located in each clamp half 122 and 124 of the dual spherical ball clamp 120. Each of the four apertures 138 in the first clamp half 122 align with one of the four apertures 138 in the second clamp half 124. One aperture 138 is located both above and below each of the sockets 128. Tightening or loosening the bolts 140 proximate to a desired socket 128 allows for adjustment of the gap 142 at a socket 128. The distance of the gap 142 at one socket 128 can differ from the distance of the gap 142 at the other socket 128. Adjusting the distance of the gap 142 at a desired socket 128 allows one of the arms 138 to be pivoted while the other arm 138 remains locked. Additionally, employing four bolts 140 provides for greater holding strength of the clamp halves 122 and 124 together.

The foregoing description is exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention.

What is claimed is:

1. A ball and socket assembly for a robotic arm, comprising:
   a socket component including a first clamp half and a second clamp half that are securable together to form a pair of sockets, each of said first clamp half and said second clamp half having a first outer face generally defining a first plane and a second outer face generally defining a second plane that is non-parallel with said first plane, wherein each of the first clamp half and the second clamp half form a portion of each of the pair of sockets;
   a first ball receivable partially within said first socket such that said first ball extends through said first plane; and
   a second ball receivable partially within said second socket such that said second ball extends through said second plane.

2. The robotic arm as recited in claim 1, wherein each of said first clamp half and said second clamp half is a single, distinct piece.

3. The robotic arm as recited in claim 1 wherein movement of one of said balls in one of said pair of sockets pivotally adjusts a position of said arm.

4. The robotic arm as recited in claim 1 wherein each ball includes an arm that extends there from, wherein one of said arms can be pivoted relative to the other of said arms.

5. The robotic arm as recited in claim 1 wherein said pair of sockets are made of aluminum.

6. The robotic arm as recited in claim 1 wherein each of said pair of sockets cover move than one half of a surface area of one of said balls.

7. The robotic arm as recited in claim 1 wherein said balls have a ball diameter of approximately 1.75 inch and said arms have an arm diameter of approximately 1.25 inch.

8. The robotic arm as recited in claim 1 wherein said balls are made of a ball material and said pair of sockets are made of a socket material, wherein said ball material is harder than said socket material.

9. The robotic arm as recited in claim 1 wherein said first clamp half and said second clamp half are secured together by a pair of bolts located between said pair of sockets.

10. The robotic arm as recited in claim 1 wherein said first clamp half and said second clamp half are secured together by four bolts, one of said four bolts being located over one of said pair of sockets, another of said four bolts being located under said one of said pair of sockets, one of said four bolts being located over the other of said pair of sockets, and one of said four bolts being located under said other of said pair of sockets.

11. The robotic arm as recited in claim 1 wherein a gap is defined between said first clamp half and said second clamp half.

12. The robotic arm as recited in claim 11 wherein said gap is adjustable.

13. The robotic arm as recited in claim 1 wherein said robotic arm includes a plurality of said ball and socket assemblies.

14. The robotic arm as recited in claim 1 wherein an angle defined between each of said pair of faces and a plane defined by said lower surface is approximately 75°.

15. The robotic arm as recited in claim 1 wherein said balls are serrated.

16. The robotic arm as recited in claim 1 wherein said arm of each of said pair of ball components has a range of motion of 90°.

* * * * *